Figure 3:
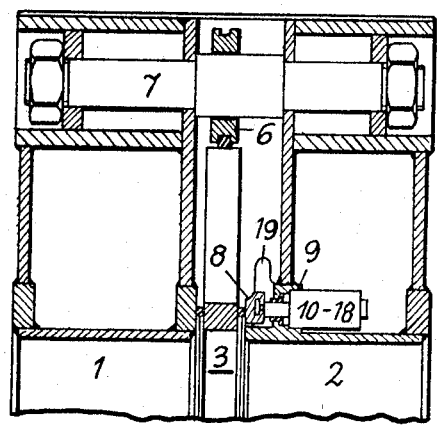

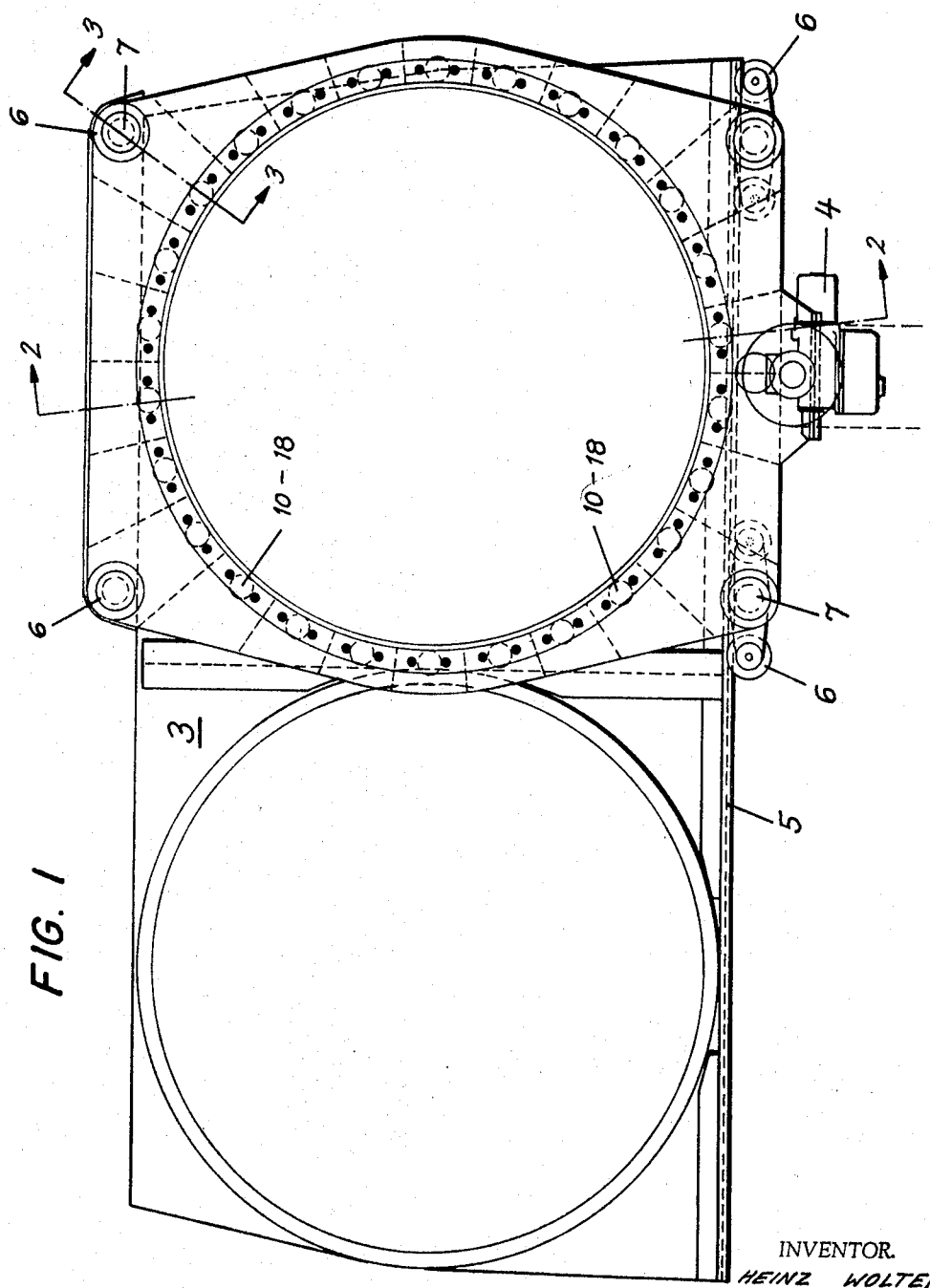

Aug. 16, 1966 H. WOLTER 3,266,525
GATE VALVE
Filed Sept. 30, 1963 3 Sheets-Sheet 2

INVENTOR.
HEINZ WOLTER
BY Edwin Levisohn
& Henry R. Lerner
ATTORNEYS

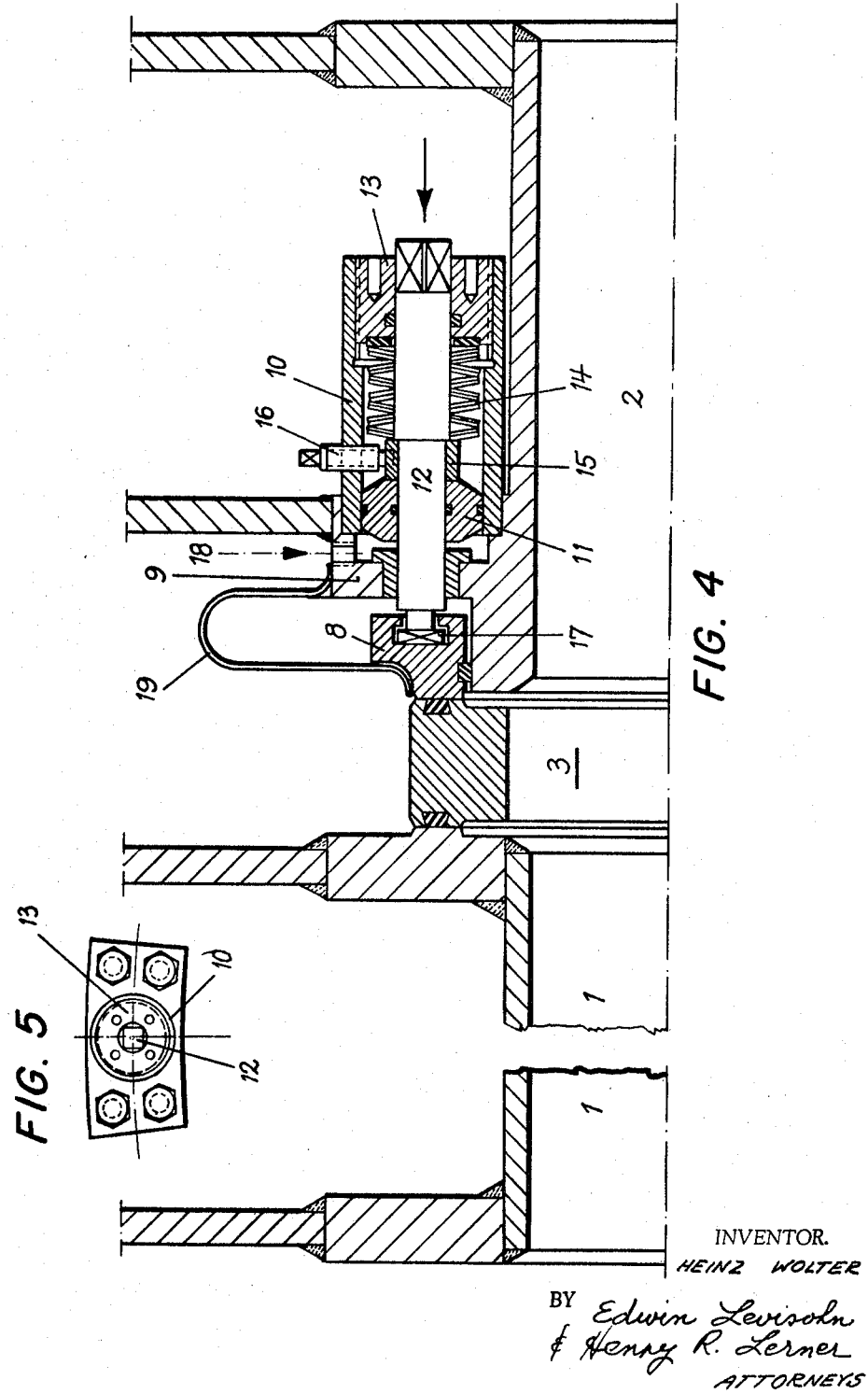

United States Patent Office 3,266,525
Patented August 16, 1966

3,266,525
GATE VALVE
Heinz Wolter, Wecker, Luxembourg, assignor to Usine de Wecker S.a.r.l., Wecker, Luxembourg, a corporation of Luxembourg
Filed Sept. 30, 1963, Ser. No. 312,494
6 Claims. (Cl. 138—94.3)

The present invention relates to a gas-pipe gate valve for large flow passages with a closure disk consisting of a gland section and of a seal section, said disk being adapted to be positioned between a fixed pipe end and a seal ring that is movable on the opposite pipe end. To absorb the sealing pressures upon the large sealing faces between which the closure disk is wedged in the closed position, the opposed pipe ends are rigidly joined to each other by straps and/or bolts. The number of connecting pieces is limited to permit the closure disk to be positioned at right angles to the flow passage of the gate valve. This drawback is encountered particularly when the casing is open. To permit the closure disk to be wedged in between the pipe ends and to be withdrawn therefrom, there is provided on one pipe end an axially movable seal ring which is forced, by means of energy-storing devices, against the sealing surfaces of the closure disk by pressure members and lifted therefrom by hydraulic means. The prior-art versions of such systems are quite complicated. Their design gives rise to axial forces which have a deleterious effect on wedging in and releasing of the closure disk. Moreover, they do not assure uniform pressure per unit area upon the seats of the seals.

The invention has as its object to remedy these drawbacks by extremely simple means. Its salient feature is that the piston of the hydraulic system of each pressure member, and also its pressure chambers, are disposed between the associated energy-storing device and the movable seal ring.

The invention is schematically illustrated in terms of an exemplified embodiment in the drawing, where—

Figure 2:
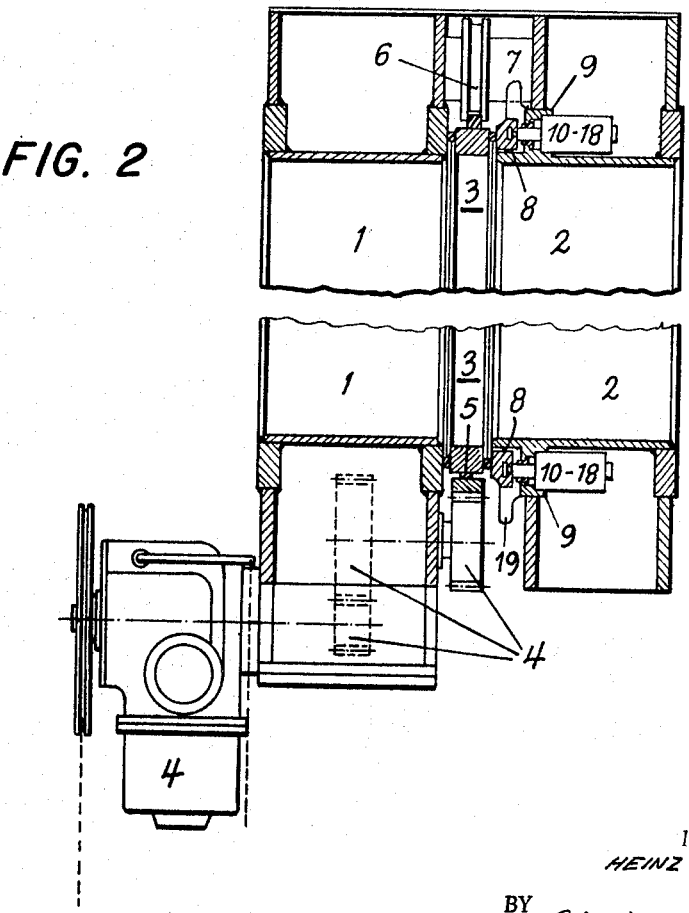

FIG. 1 is a front view of a pipe gate valve in accordance with the invention;
FIG. 2 is a partial section along the line 2—2 in FIG. 1;
FIG. 3 is a section taken along the line 3—3 in FIG. 1;
FIG. 4 is a pressure point of the pressure members, uniformly distributed over the circumference, in enlarged longitudinal section; and
FIG. 5 is a front view of a pressure member taken along the line 5 in FIG. 4.

In the embodiment diagrammed in the drawing, there is displaced between the pipe ends 1 and 2 a closure disk or gate 3 that is composed of a gland section and of a seal section. The displacement of said closure disk is actuated by a drive 4 which suitably engages, by means of gearing, a toothed rack 5 mounted on the disk. Rollers, wheels, drums or the like 6 turn loosely on tie bolts 7 whereby the pipe ends 1 and 2 are rigidly joined together. Disposed on one pipe end 2 is an axially movable seal ring 8. It is an object of the invention to provide a particularly effective locking means for the axial movement of seal ring 8, and consequently for wedging in and releasing the closure disk.

The pipe end 2 carrying the movable seal ring 8 has a flange 9 constructed to serve also as a cylinder head for all of the pressure members, which are uniformly distributed over the circumference.

Each hydraulic pressure member has a cylinder 10 which is axially disposed on the pipe end 2 and in which a piston 11 moves. Piston 11 is attached to a piston rod 12. At its end opposite to the casing flange 9, piston rod 12 is supported in a screw plug 13 of cylinder 10. Disposed between piston 11 and screw plug 13 is an energy-storing device 14, located inside of cylinder 10. To provide a guide for the hydraulic system 11 to 14 and to prevent it from turning, there is provided between piston 11 and energy-storing device 14 a guide ring 15 that is rigidly joined to piston rod 12 and whose axial groove is engaged by a guide pin 16.

The end 17 of piston rod 12 engages the seal ring 8. In the embodiment shown in the drawing, the end 17 of piston rod 12 has a head which mates with an appropriate depression in seal ring 8. Between the casing flange 9 and each cylinder 10 is a pressure chamber of the hydraulic system which communicates with the inlet 18 for the working medium. It has been found that the pressure chambers of the hydraulic system of all pressure members are best interconnected to assure the uniform release of gate disk 3 over its entire periphery. A bypass formed by an elastic bellows 19 or the like is provided between the axially movable seal ring 8 and the casing flange 9.

The energy-storage device 14, which bears against the fixed seal disk 13 of the cylinder 10 and against the guide ring 15 that is rigidly joined to piston rod 12, moves the piston rod 12 toward the movable seal ring 8, which provides the clamping effect that results in the requisite sealing action of closure disk 3. All that need be done to release closure disk 3 is to pressurize the pressure chambers of the pressure members between the casing flange 9 and the piston 11 of the cylinders 10 by way of the feedline 18, which will cause piston rod 12 to be displaced against the force of energy-storing device 14, and seal ring 8 to be lifted from disk 3, which can then be positioned perpendicularly to the flow passage.

An individual feedline 18 may be provided for each cylinder 10, or a common feedline may be connected to an attached ring distributor or a built-in pipe distributor.

While I have shown and described the preferred embodiment of my invention, it will be understood that the invention may be embodied otherwise than as herein specifically illustrated or described, and that in the illustrated embodiments certain changes in the details of construction and in the form and arrangement of parts may be made without departing from the underlying idea or principles of this invention within the scope of the appended claims.

Having thus described my invention, what I claim and desire to secure by Letters Patent is:

1. A gas-pipe gate valve for large flow passages comprising a closure disk, means for moving and positioning said closure disk between a fixed pipe end and a seal ring which is movable on the opposite pipe end, said closure disk being wedged in axially by a plurality of piston-including pressure members which are uniformly distributed over the circumference of the ring by means of energy storing devices, and said closure disk being hydraulically released by introducing pressure means into associated pressure chambers, characterized by the fact that the piston of each pressure member and its associated pressure chamber is disposed between the associated energy-storing device and the movable seal ring.

2. A gas-pipe valve as defined in claim 1, characterized by the fact that the energy-storing device of each pressure member is mounted on a piston whose opposite end engages the movable seal ring.

3. A gas-pipe gate valve as defined in claim 2, characterized by the fact that the energy-storing device of each pressure member is disposed in a cylinder provided for each piston.

4. A gas-pipe gate valve as defined in claim 3, characterized by the fact that the pressure chambers of the hydraulic system of all pressure members communicate with one another by way of an integral ring distributor or of an attached pipe distributor.

5. A gas-pipe gate valve as defined in claim 4, characterized by the fact that each pressure chamber of a hydraulic system has a separate inlet for the pressure means.

6. A gas-pipe gate valve as defined in claim 5, characterized by the fact that the movable seal ring and the casing flange forming the cylinder head of all pressure members are bypassed by an elastic bellows.

References Cited by the Examiner

UNITED STATES PATENTS

| | | | |
|---|---|---|---|
| 2,299,124 | 10/1942 | Boynton et al. | 251—159 |
| 2,913,220 | 11/1959 | Cover | 251—328 |
| 3,058,492 | 10/1962 | Kinney et al. | 138—94.3 |
| 3,110,470 | 11/1963 | Dumm | 25—159 |

FOREIGN PATENTS 562,721  5/1958  Belgium.

LAVERNE D. GEIGER, *Primary Examiner.*

H. ARTIS, *Assistant Examiner.*